United States Patent
Sobanski et al.

(10) Patent No.: US 12,215,620 B2
(45) Date of Patent: Feb. 4, 2025

(54) HEAT EXCHANGER(S) FOR RECOVERING WATER AND/OR HEAT ENERGY FROM TURBINE ENGINE COMBUSTION PRODUCTS

(71) Applicant: Raytheon Technologies Corporation, Farmington, CT (US)

(72) Inventors: Jon E. Sobanski, Glastonbury, CT (US); Jacob C. Snyder, East Haddam, CT (US); Neil J. Terwilliger, Cheshire, CT (US)

(73) Assignee: RTX Corporation, Farmington, CT (US)

( * ) Notice: Subject to any disclaimer, the term of this patent is extended or adjusted under 35 U.S.C. 154(b) by 18 days.

(21) Appl. No.: 18/119,154

(22) Filed: Mar. 8, 2023

(65) Prior Publication Data
US 2024/0301823 A1 Sep. 12, 2024

(51) Int. Cl.
*F02C 6/18* (2006.01)

(52) U.S. Cl.
CPC ............ *F02C 6/18* (2013.01); *F05D 2240/35* (2013.01); *F05D 2260/213* (2013.01)

(58) Field of Classification Search
CPC ............... F28D 7/1669; F28D 21/0001; F28D 21/0014; F28D 2021/0026; F01D 25/32; F02C 3/30; F02C 6/18; F02K 3/105; F02K 3/115; F01K 23/108; F01K 23/106; F01K 23/10; F05D 2240/35
See application file for complete search history.

(56) References Cited

U.S. PATENT DOCUMENTS

| | | | |
|---|---|---|---|
| 3,266,564 A | 8/1966 | Sabatiuk | |
| 3,604,207 A | 9/1971 | Waidelich | |
| 3,646,760 A | 3/1972 | Waidelich | |
| 10,184,372 B2 | 1/2019 | Shin | |
| 12,000,334 B1 * | 6/2024 | Sobanski | ............... F02C 3/30 |
| 2021/0207500 A1 | 7/2021 | Klingels | |
| 2023/0286661 A1 * | 9/2023 | Klingels | ............... B64D 33/04 |
| 2023/0332522 A1 * | 10/2023 | Klingels | ............... B64D 27/40 |
| 2024/0263578 A1 | 8/2024 | Sobanski | |

OTHER PUBLICATIONS

EP Search Report for EP Patent Application No. 24154836.1 dated Sep. 13, 2024.

* cited by examiner

*Primary Examiner* — Todd E Manahan
*Assistant Examiner* — Rodolphe Andre Chabreyrie
(74) *Attorney, Agent, or Firm* — Getz Balich LLC (57) ABSTRACT

A turbine engine with an axis is provided. This turbine engine includes a fan section, a turbine engine core, a bypass flowpath, a recovery system and a core flowpath. The turbine engine core is configured to power the fan section. The turbine engine core includes a core compressor section, a core combustor section and a core turbine section. The bypass flowpath is fluidly coupled with and downstream of the fan section. The recovery system includes an evaporator module and a condenser module. The condenser module is arranged radially outboard of and axially overlaps the bypass flowpath. The core flowpath extends sequentially through the core compressor section, the core combustor section, the core turbine section, the evaporator module and the condenser module.

16 Claims, 7 Drawing Sheets

HEAT EXCHANGER(S) FOR RECOVERING WATER AND/OR HEAT ENERGY FROM TURBINE ENGINE COMBUSTION PRODUCTS

GOVERNMENT LICENSE RIGHTS

This invention was made with Government support under Contract DE-AR0001561 awarded by the United States Department of Energy, Office of ARPA-E. The Government has certain rights in this invention.

BACKGROUND OF THE DISCLOSURE

1. Technical Field

This disclosure relates generally to a turbine engine and, more particularly, to recovering water and/or heat energy from combustion products of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor, and exhausted combustion products carry waste heat energy. Various systems and methods are known in the art for recovering the water vapor and/or the heat energy. While these known systems and methods have various advantages, there is still room in the art for improvement.

SUMMARY OF THE DISCLOSURE

According to an aspect of the present disclosure, a turbine engine with an axis is provided. This turbine engine includes a fan section, a turbine engine core, a bypass flowpath, a recovery system and a core flowpath. The turbine engine core is configured to power the fan section. The turbine engine core includes a core compressor section, a core combustor section and a core turbine section. The bypass flowpath is fluidly coupled with and downstream of the fan section. The recovery system includes an evaporator module and a condenser module. The condenser module is arranged radially outboard of and axially overlaps the bypass flowpath. The core flowpath extends sequentially through the core compressor section, the core combustor section, the core turbine section, the evaporator module and the condenser module.

According to another aspect of the present disclosure, another turbine engine with an axis is provided. This turbine engine includes a fan section, a turbine engine core, a bypass flowpath, a recovery system and a core flowpath. The turbine engine core is configured to power the fan section. The turbine engine core includes a core compressor section, a core combustor section and a core turbine section. The bypass flowpath is fluidly coupled with and downstream of the fan section. The recovery system includes an evaporator module and a condenser module. The evaporator module extends radially across the bypass flowpath. The core flowpath extends sequentially through the core compressor section, the core combustor section, the core turbine section, the evaporator module and the condenser module.

According to still another aspect of the present disclosure, another turbine engine is provided. This turbine engine includes a turbine engine core, a recovery system and a core flowpath. The turbine engine core includes a core compressor section, a core combustor section and a core turbine section. The recovery system includes a first evaporator module, a first condenser module, a second evaporator module and a second condenser module. The first condenser module is arranged radially outboard of and overlaps an outer section of the first evaporator module. The second condenser module is arranged radially outboard of and overlaps an outer section of the second evaporator module. An inner section of the second evaporator module is circumferentially aligned with the first condenser module. The core flowpath includes a base leg, a first heat exchange leg and a second heat exchange leg. The base leg extends sequentially through the core compressor section, the core combustor section and the core turbine section towards the first heat exchange leg and the second heat exchange leg. The first heat exchange leg branches off from the base leg and extends sequentially through the first evaporator module and the first condenser module. The second heat exchange leg branches off from the base leg and extends sequentially through the second evaporator module and the second condenser module.

The turbine engine may also include a fan section and a bypass flowpath. The bypass flowpath may be fluidly coupled with and downstream of the fan section. The turbine engine core may be configured to power the fan section.

The first condenser module may be disposed radially outboard of the bypass flowpath. In addition or alternatively, the second condenser module may be disposed radially outboard of the bypass flowpath.

An intermediate section of the second evaporator module may extend radially across a flowpath from the inner section of the second evaporator module to the outer section of the second evaporator module.

The turbine engine may also include a propulsor rotor. The turbine engine core may be configured to power the propulsor rotor.

The condenser module may be disposed radially outboard of the evaporator section.

The evaporator module may be disposed axially between the fan section and the turbine engine core.

The condenser module may be arranged radially outboard of and axially overlap the evaporator module.

At least a portion of the evaporator module may be arranged radially outboard of and/or axially overlap the bypass flowpath.

The turbine engine may also include an engine housing, and the engine housing may include a cavity radially outboard of and axially overlapping the bypass flowpath. The evaporator module may be disposed at least partially or completely in the cavity. The condenser module may be disposed at least partially or completely in the cavity.

The evaporator module may extend radially across the bypass flowpath.

The evaporator module may include an inner section, an outer section and an intermediate section. The inner section may be radially inboard of and axially overlapped by the bypass flowpath. The outer section may be radially outboard of and axially overlap the bypass flowpath. The intermediate section may be fluidly coupled with and extend radially between the inner section and the outer section.

The core flowpath may extend axially along the axis into the evaporator module. The core flowpath may extend radially away from the axis out of the evaporator module.

The condenser module may be arranged axially between the fan section and the turbine engine core.

The condenser module may extend circumferentially about the axis between twenty degrees and ninety degrees.

The core flowpath may extend radially away from the axis into the condenser module. The core flowpath extends axially along the axis out of the condenser module.

An exhaust out from the core flowpath may be disposed radially outboard of the bypass flowpath.

The condenser module may be configured to condense water vapor flowing through the core flowpath into water, and the recovery system may be configured to collect the water. The evaporator module may be configured to evaporate at least some of the water into steam, and the recovery system may be configured to provide the steam to the turbine engine core.

The recovery system may be configured to provide the steam to the core combustor section.

The turbine engine may also include a fuel system configured to inject hydrogen fuel into a combustion chamber of the core combustor section for combustion.

The turbine engine may also include a flow circuit, and the flow circuit may include the condenser module and a second condenser module. The flow circuit may be configured to circulate a working fluid through the condenser module and the second condenser module. The second condenser module may be arranged radially inboard of the bypass flowpath.

The turbine engine may also include a second bypass flowpath fluidly coupled with and downstream of the fan section. The second bypass flowpath may be radially inboard of the bypass flowpath and extend through the second condenser module.

A port may extend radially through the second condenser module. The evaporator module may project radially through the port.

The turbine engine may also include a second evaporator module and a second condenser module. The core flowpath may include a first heat exchange leg, a second heat exchange leg and a base leg. The first heat exchange leg may branch off from the base leg and extend sequentially through the evaporator module and the condenser module. The second heat exchange leg may branch off from the base leg and extend sequentially through the second evaporator module and the second condenser module.

The second condenser module may be arranged outboard of the bypass flowpath and axially aligned with the condenser module along the axis.

The turbine engine core may have a reverse flow configuration.

The core turbine section may be arranged axially between the fan section and the core compressor section.

The turbine engine may also include a power turbine section and a rotating structure. The power turbine section may be arranged axially between the fan section and the turbine engine core. The rotating structure may include a fan rotor and a power turbine rotor. The fan rotor may be within the fan section, and the power turbine rotor may be within the power turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
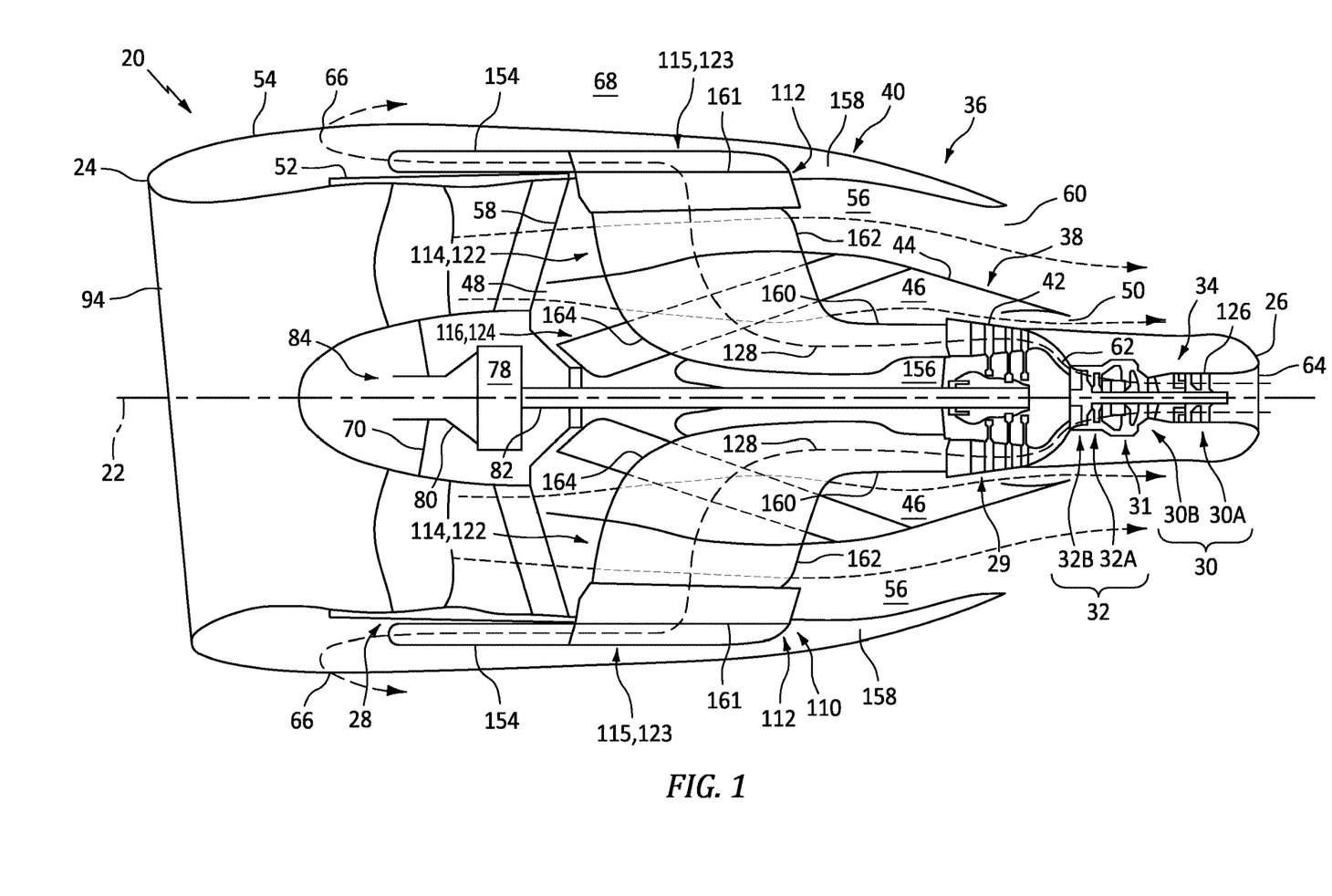
FIG. 1 is a side sectional illustration of a gas turbine engine.

FIG. 1 is a side sectional illustration of a gas turbine engine 20 for an aircraft propulsion system. This turbine engine 20 extends axially along a centerline axis 22 between a forward, upstream end 24 of the turbine engine 20 and an aft, downstream end 26 of the turbine engine 20. The turbine engine 20 includes a fan section 28, a power turbine (PT) section 29 and a turbine engine core 34; e.g., gas generator. The engine core 34 includes a core compressor section 30, a core combustor section 31 and a core turbine section 32. The core compressor section 30 of FIG. 1 includes a low pressure compressor (LPC) section 30A and a high pressure compressor (HPC) section 30B. The core turbine section 32 of FIG. 1 includes a high pressure turbine (HPT) section 32A and a low pressure turbine (LPT) section 32B.

The fan section 28, the PT section 29 and the engine core 34 are arranged sequentially along the axis 22 within an engine housing 36. This engine housing 36 includes a housing inner structure 38 and a housing outer structure 40.

The inner structure 38 includes an inner case 42 and an inner nacelle 44. The inner case 42 houses any one or more or all of the engine sections 29-32B. The inner nacelle 44 houses and provides an aerodynamic cover over at least the inner case 42. The inner nacelle 44 of FIG. 1 also forms an outer peripheral boundary of an inner bypass flowpath 46 radially within the inner structure 38. This inner bypass flowpath 46 extends longitudinally (e.g., generally axially) within the inner structure 38 from an inlet 48 into the inner bypass flowpath 46 to an exhaust 50 out from the inner bypass flowpath 46. The inner bypass inlet 48 is fluidly coupled with and arranged downstream of the fan section 28, for example axially adjacent the fan section 28. The inner bypass exhaust 50 is arranged axially aft, downstream of the inner bypass inlet 48, for example radially outboard of and/or axially aligned with the LPT section 32B.

The outer structure 40 includes an outer case 52 and an outer nacelle 54. The outer case 52 houses at least the fan section 28. The outer nacelle 54 houses and provides an aerodynamic cover over at least the outer case 52. The outer nacelle 54 of FIG. 1 is also disposed radially outboard of, extends circumferentially about (e.g., circumscribes) and extends axially along (e.g., overlaps) at least a forward portion of the inner nacelle 44. With this arrangement, the inner structure 38 and its inner nacelle 44 and the outer structure 40 and its outer nacelle 54 form an outer bypass flowpath 56 within the engine housing 36. This outer bypass flowpath 56 is disposed radially outboard of, extends circumferentially about (e.g., circumscribes) and extends axially along (e.g., overlaps) at least a forward portion of the inner bypass flowpath 46. The outer bypass flowpath 56 extends longitudinally (e.g., generally axially) within the engine housing 36 (e.g., radially between the inner structure 38 and the outer structure 40) from an inlet 58 into the outer bypass flowpath 56 to an exhaust 60 out from the outer bypass flowpath 56. The outer bypass inlet 58 is fluidly coupled with and arranged downstream of the fan section 28, for example axially adjacent the fan section 28. The outer bypass inlet 58 is also radially outboard of and/or axially aligned with the inner bypass inlet 48. The outer bypass exhaust 60 is arranged axially aft, downstream of the outer bypass inlet 58, for example radially outboard of and/or axially aligned with (or proximate) the PT section 29. The outer bypass exhaust 60 may also be disposed axially forward of and/or radially outboard of the inner bypass exhaust 50.

A core flowpath 62 extends sequentially through the LPC section 30A, the HPC section 30B, the combustor section 31, the HPT section 32A, the LPT section 32B and the PT section 29 from an inlet 64 into the core flowpath 62 to an exhaust 66 out from the core flowpath 62. The core inlet 64 of FIG. 1 is disposed at (e.g., on, adjacent or proximate) the engine downstream end 26. This core inlet 64 is formed by the inner structure 38. The core exhaust 66 of FIG. 1 is disposed axially forward of the core inlet 64. The core exhaust 66 of FIG. 1, for example, is disposed radially outboard of the outer bypass flowpath 56, and the core exhaust 66 may be axially aligned with or forward of the fan section 28. This core exhaust 66 is formed by the outer structure 40. The core exhaust 66 may be adjacent and fluidly coupled with an environment 68 external to (e.g., outside of) the turbine engine 20. However, it is contemplated the core exhaust 66 may alternative be adjacent and fluidly coupled with the outer bypass flowpath 56.

Figure 2:
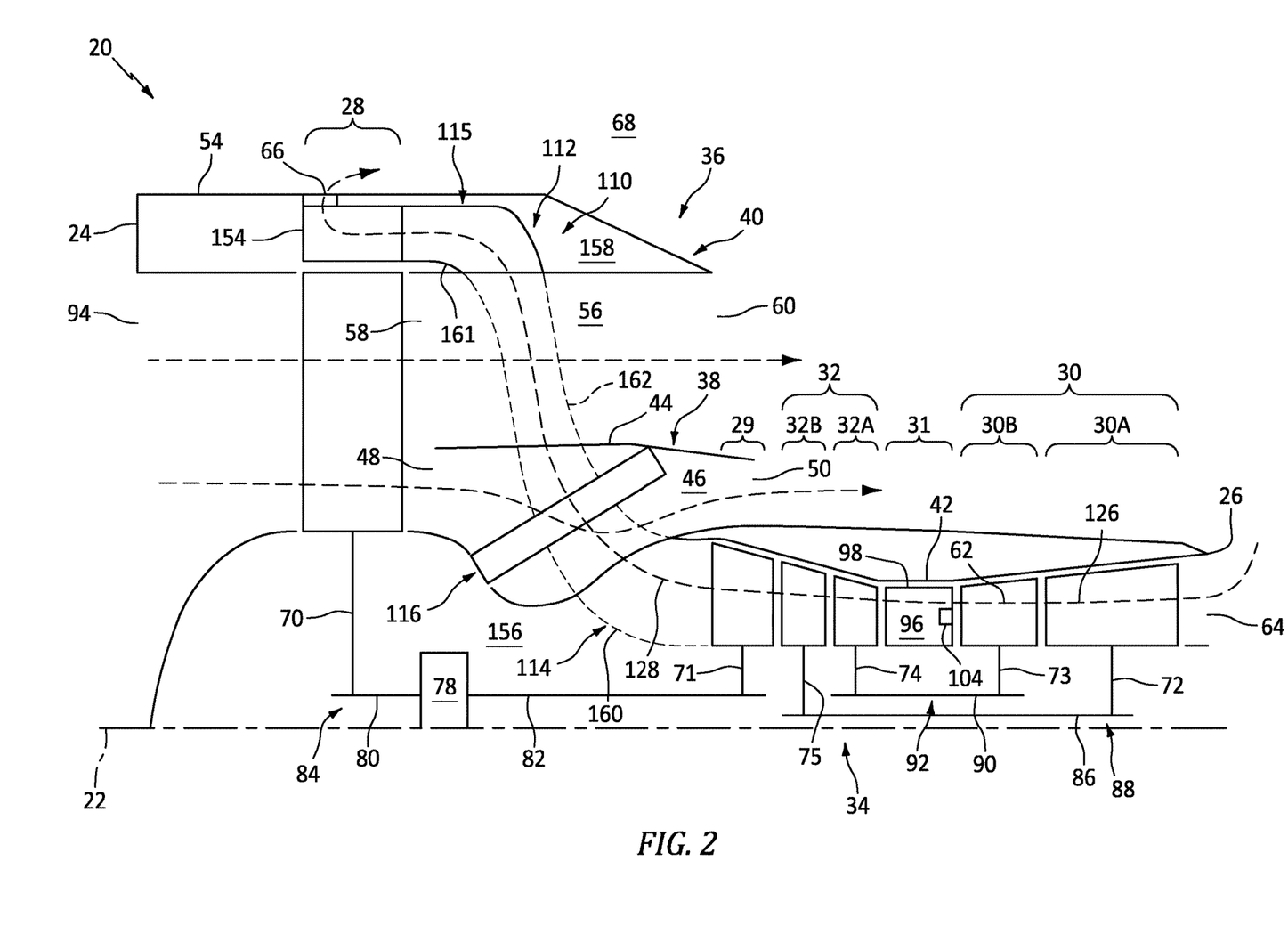
FIG. 2 is a partial schematic illustration of the turbine engine.

Referring to FIG. 2, the engine core 34 may be configured as a reverse flow engine core. The core flowpath 62 of FIG. 2, for example, extends through any one or more or all of the engine sections 30A-32B and 29 in an axially forward direction. Similarly, the turbine engine 20 is configured to move through the external environment 68 in the axially forward direction; e.g., during forward aircraft flight. By contrast, each bypass flowpath 46, 56 extends axially within the turbine engine 20 and its engine housing 36 in an axially aft direction that is opposite the axially forward direction. With such an arrangement, the engine sections 30A-32B, 29 and 28 may be arranged sequentially along the axis 22 between the engine downstream end 26 and the engine upstream end 24.

Each of the engine sections 28, 29, 30A, 30B, 32A and 32B of FIG. 2 includes a respective bladed rotor 70-75. Each of these bladed rotors 70-75 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 70 is connected to a geartrain 78 through a fan shaft 80. The geartrain 78 is connected to the PT rotor 71 through a power turbine (PT) shaft 82. At least (or only) the fan rotor 70, the fan shaft 80, the geartrain 78, the PT shaft 82 and the PT rotor 71 collectively form a fan rotating structure 84. This fan rotating structure 84 of FIG. 2 is configured as a geared rotating structure where, for example, the PT rotor 71 rotates at a different (e.g., faster) speed than the fan rotor 70. However, it is contemplated the fan rotating structure 84 may alternatively be a direct drive rotating structure where, for example, the fan shaft 80 and the geartrain 78 are omitted and the PT shaft 82 directly connects the fan rotor 70 and the PT rotor 71 together. Referring again to FIG. 2, the LPC rotor 72 is connected to the LPT rotor 75 through a low speed shaft 86. At least (or only) the LPC rotor 72, the low speed shaft 86 and the LPT rotor 75 collectively form a low speed rotating structure 88 of the engine core 34. The HPC rotor 73 is connected to the HPT rotor 74 through a high speed shaft 90. At least (or only) the HPC rotor 73, the high speed shaft 90 and the HPT rotor 74 collectively form a high speed rotating structure 92 of the engine core 34. Each of the engine rotating structures 84, 88, 92 may be rotatable about the axis 22; e.g., a rotational axis. These engine rotating structures 84, 88, 92 may be rotatably connected to and supported by the engine housing 36 and its inner structure 38 through a plurality of bearings.

During operation, air enters the turbine engine 20 and its engine core 34 at the engine downstream end 26 through the core inlet 64. This air directed into the core flowpath 62 may be referred to as "core air". Air also enters the turbine engine 20 at the engine upstream end 24 through a forward engine inlet 94. This air is directed through the fan section 28 and into the inner bypass flowpath 46 and into the outer bypass flowpath 56; e.g., in parallel. The air within the outer bypass flowpath 56 may be referred to as "bypass air". The air within the inner bypass flowpath 46 may be referred to as "cooling air".

The core air is compressed by the LPC rotor 72 and the HPC rotor 73 and directed into a combustion chamber 96 of a combustor 98 (e.g., an annular combustor) in the combustor section 31. Fuel is injected into the combustion chamber 96 and mixed with the compressed core air to provide a fuel-air mixture. This fuel-air mixture is ignited and combustion products thereof flow through and sequentially cause the HPT rotor 74, the LPT rotor 75 and the PT rotor 71 to rotate. The rotation of the HPT rotor 74 and the LPT rotor 75 respectively drive rotation of the HPC rotor 73 and the LPC rotor 72 and, thus, compression of the air received from the core inlet 64. The rotation of the PT rotor 71 (e.g., independently) drives rotation of the fan rotor 70. The rotation of the fan rotor 70 propels the bypass air through and out of the outer bypass flowpath 56 and propels the cooling air through and out of the inner bypass flowpath 46. The propulsion of the bypass air may account for a majority of thrust generated by the turbine engine 20.

Figure 3:
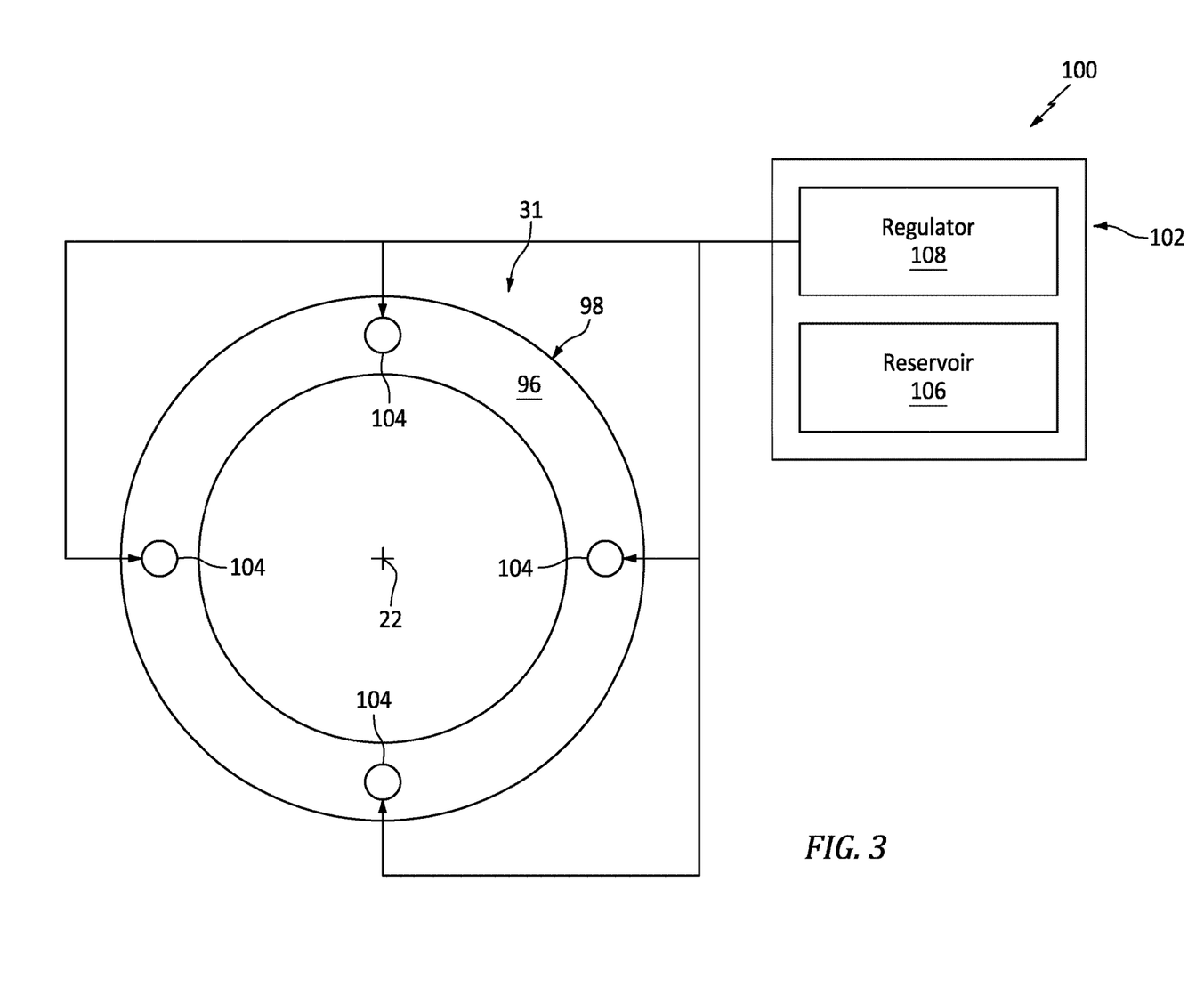
FIG. 3 is a schematic illustration of a fuel system for the turbine engine.

Referring to FIG. 3, the turbine engine 20 includes a fuel system 100 for delivering the fuel to the combustor 98. This fuel system 100 includes a fuel source 102 and one or more fuel injectors 104; see also FIG. 2. The fuel source 102 of FIG. 3 includes a fuel reservoir 106 and/or a fuel flow regulator 108; e.g., a valve. The fuel reservoir 106 is configured to store the fuel before, during and/or after turbine engine operation. The fuel reservoir 106, for example, may be configured as or otherwise include a tank, a cylinder, a pressure vessel, a bladder or any other type of fuel storage container. The fuel flow regulator 108 is configured to direct and/or meter a flow of the fuel from the fuel reservoir 106 to the fuel injectors 104. The fuel injectors 104 may be arranged circumferentially about the axis 22 in an array. Each fuel injector 104 is configured to direct the fuel received from the fuel source 102 into the combustion chamber 96 for mixing with the compressed core air to provide the fuel-air mixture.

The turbine engine 20 of FIGS. 1 and 2 may be configured as a non-hydrocarbon turbine engine/a hydrocarbon free turbine engine. The turbine engine 20, for example, may be configured as a hydrogen fueled turbine engine. The fuel injected into the combustion chamber 96 by the fuel injectors 104 (see FIGS. 2 and 3), for example, may be hydrogen ($H_2$) fuel; e.g., $H_2$ gas. The present disclosure, however, is not limited to hydrogen fueled turbine engines nor to non-hydrocarbon turbine engines. The turbine engine 20, for example, may also or alternatively be fueled by another non-hydrocarbon fuel such as, but not limited to, ammonia ($NH_3$). The turbine engine 20 may still also or alternatively be fueled using any other fuel, including hydrocarbon fuels (e.g., kerosene, jet fuel, sustainable aviation fuel (SAF), etc.), which produces combustion products that include water ($H_2O$) vapor.

Figure 4:
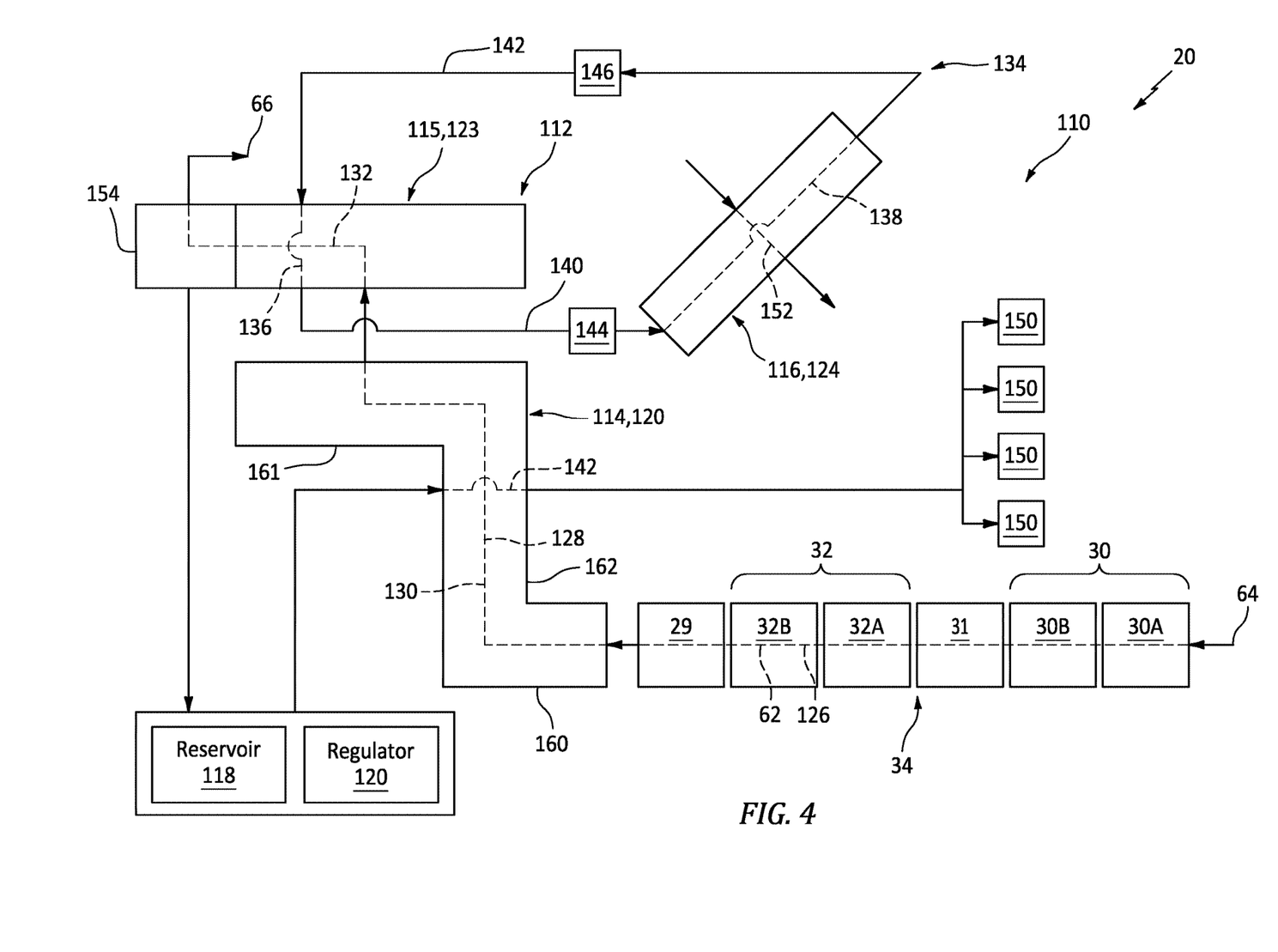
FIG. 4 is a schematic illustration of a water and heat energy recovery system arranged with other components of the turbine engine.
Figure 5:
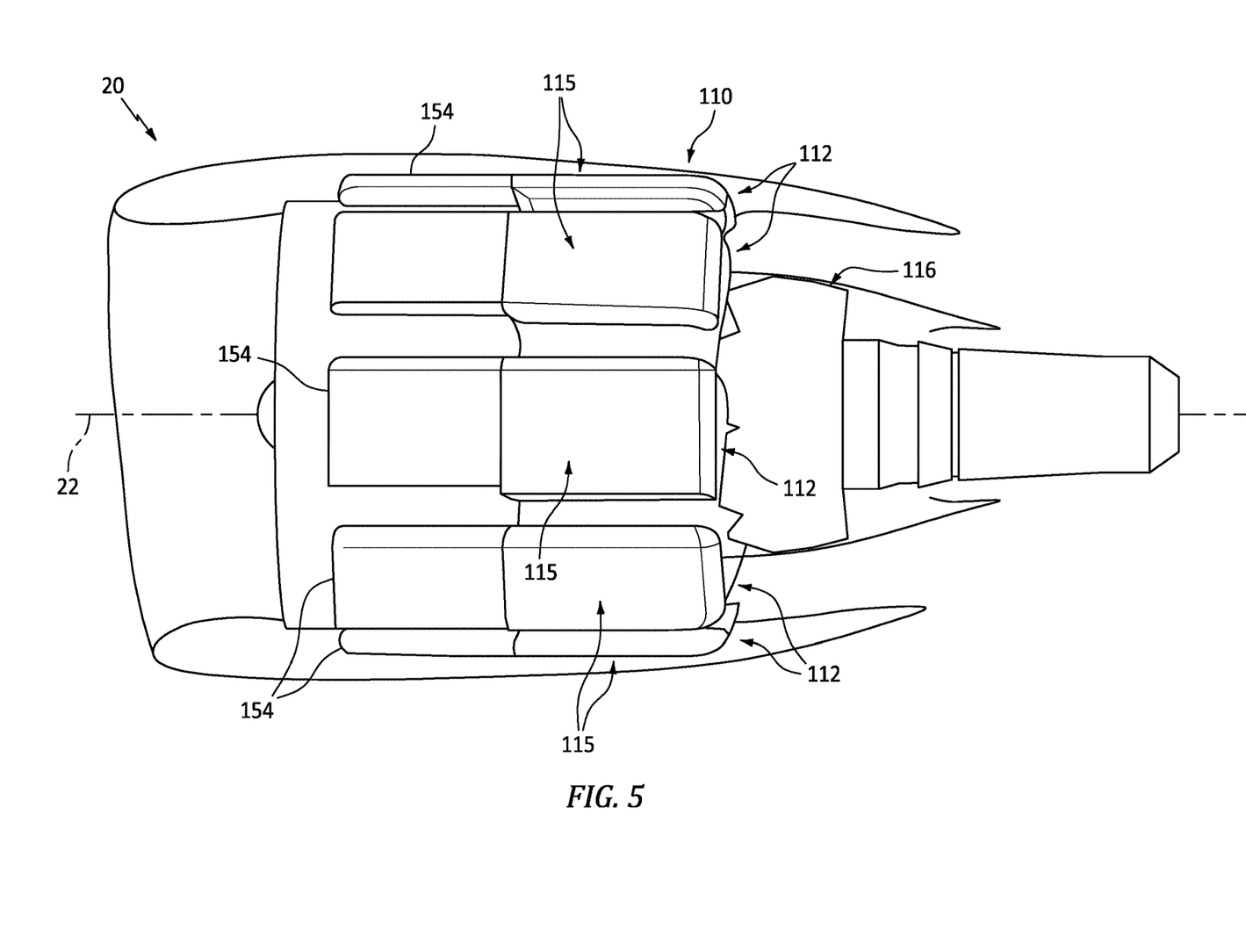
FIG. 5 is a partial cutaway illustration of the turbine engine.
Figure 6:
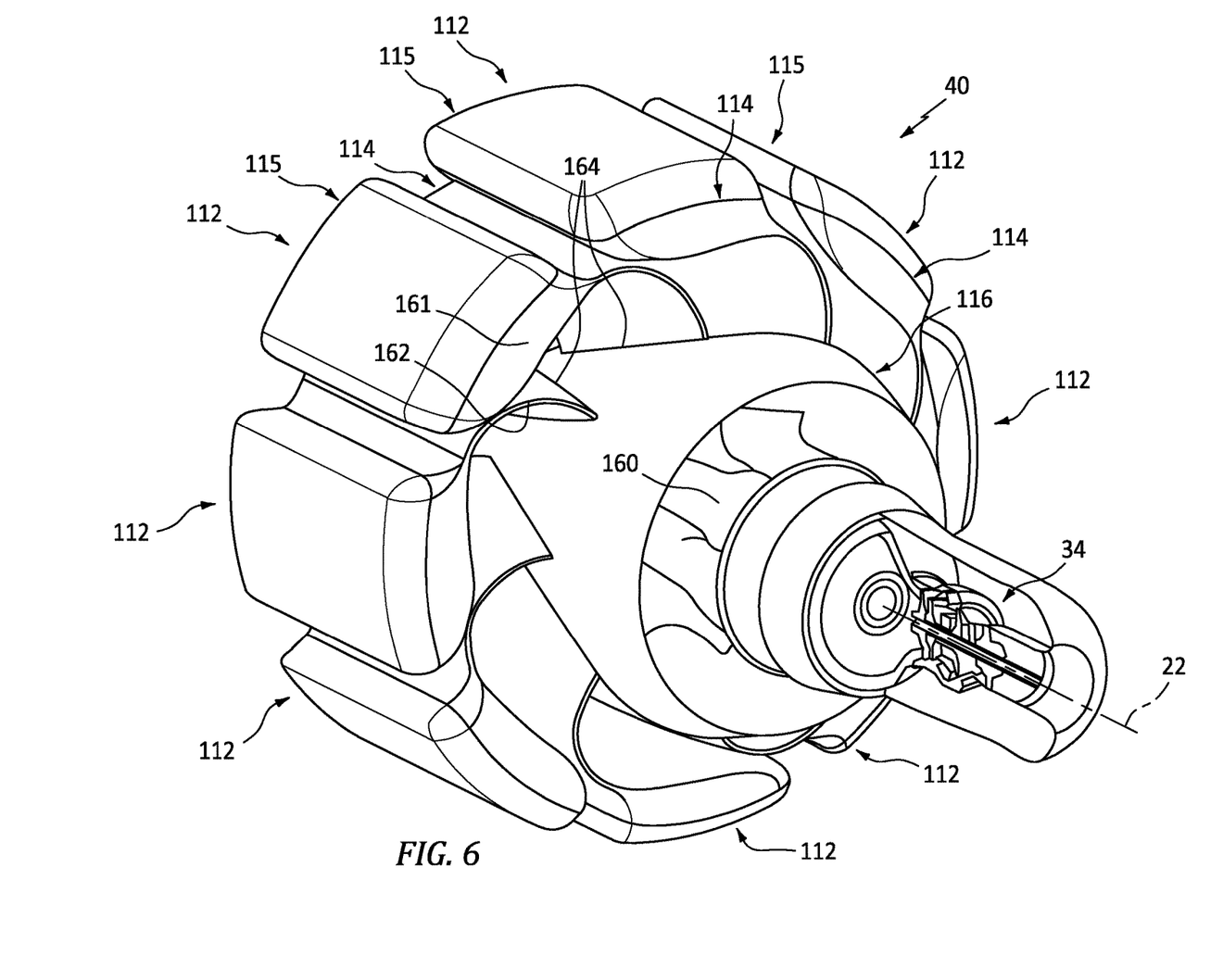
FIG. 6 is a partial perspective cutaway illustration of the recovery system arranged with a core of the turbine engine.
Figure 7:
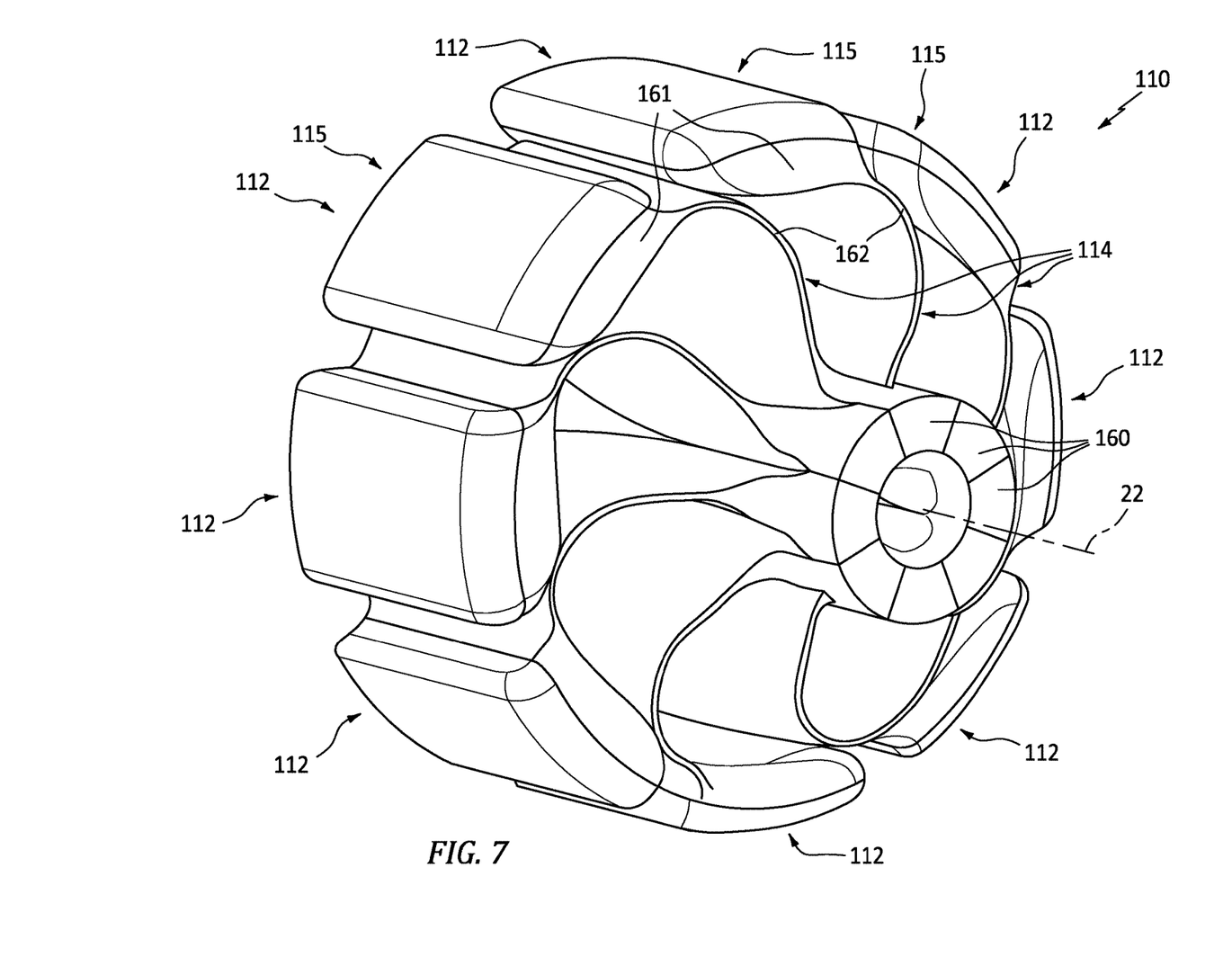
FIG. 7 is a perspective illustration of an evaporator array arranged with a condenser array.

Referring to FIG. 4, the turbine engine 20 also includes a water and heat energy recovery system 110. This recovery system 110 is configured to recovery at least some of the water vapor produced by the combustion of the fuel-air mixture within the combustion chamber 96 (see FIG. 2). The recovery system 110 is also configured to evaporate the recovered water using heat energy recuperated from the combustion products to provide steam for use in the engine core 34; e.g., in the combustor section 31. The recovery system 110 of FIG. 4, for example, includes one or more heat exchange (HX) systems 112 (one shown in FIG. 4 for ease of illustration; see also FIGS. 5-7). Referring to FIGS. 5-7, the HX systems 112 are distributed circumferentially about the axis 22 in an array; e.g., a circular array. Each HX system 112 of FIG. 4 includes a (e.g., arcuate) water evaporator module 114 and a (e.g., arcuate) water condenser module 115. The recovery system 110 may also include a (e.g., annular or arcuate) refrigerant condenser module 116, a water reservoir 118 and/or a system flow regulator 120 (e.g., a pump and/or a valve).

The water evaporator module 114 includes a water evaporator 122. The water condenser module 115 includes a water condenser 123. The refrigerant condenser module 116 includes a refrigerant condenser 124. Each heat exchanger 122, 123, 124 may form an entirety of the respective heat exchanger module 114, 115, 116. Alternatively, one or more or all of the heat exchangers 122-124 may each form a select section of the respective heat exchanger module 114-116, or that heat exchanger 122, 123, 124 may be divided into a plurality of heat exchange units which form a plurality of discrete sections of the heat exchanger module 114, 115, 116. Where the heat exchanger 122, 123, 124 forms one or more sections of the respective heat exchanger module 114, 115, 116, one or more other sections of the respective heat exchange module 114, 115, 116 may be formed by flowpath conduit(s); e.g., duct(s), pipe(s), hose(s), etc. However, for ease of description, the heat exchange module 114, 115, 116 may generally be described below as being completely or substantially formed by the respective heat exchanger 122, 123, 124.

The water evaporator module 114 and the water condenser module 115 are fluidly coupled inline with the core flowpath 62. For example, the core flowpath 62 of FIG. 1 includes a (e.g., annular) base leg 126 and one or more (e.g., non-annular) heat exchange (HX) legs 128. The base leg 126 of FIG. 4 extends sequentially through the LPC section 30A, the HPC section 30B, the combustor section 31, the HPT section 32A, the LPT section 32B and the PT section 29 from the core inlet 64 to an intersection with the HX legs 128 at a downstream end of the PT section 29. Each HX leg 128 is associated with a respective HX system 112 (see also FIG. 1). Each HX leg 128 of FIG. 4 branches off from the base leg 126 at the intersection and extends from the PT section 29, sequentially through a gas (e.g., combustion products) flowpath 130 of the water evaporator module 114 and its water evaporator 122 and a gas (e.g., combustion products) flowpath 132 of the water condenser module 115 and its water condenser 123, to the core exhaust 66. Briefly, the core exhaust 66 may be formed by a common outlet for all of the HX legs 128. Alternatively, the core exhaust 66 may be formed by a plurality of discrete outlets, where each outlet may be fluidly coupled with a respective single one of the HX legs 128 (or a respective sub-set of the HX legs 128).

Each water condenser module 115 and the refrigerant condenser module 116 are configured together in a refrigerant flow circuit 134. For example, a working fluid (e.g., refrigerant) flowpath 136 of each water condenser module 115 and its water condenser 123 and a working fluid (e.g., refrigerant) flowpath 138 of the refrigerant condenser module 116 and its refrigerant condenser 124 are fluidly coupled in a loop by a respective working fluid first passage 140 and a respective working fluid second passage 142. The first passage 140 may direct a working fluid (e.g., refrigerant or another coolant) from the respective water condenser module 115 and its fluid flowpath 136 to the refrigerant condenser module 116 and its fluid flowpath 138. The second passage 142 may direct the working fluid from the refrigerant condenser module 116 and its fluid flowpath 138 to the respective water condenser module 115 and its fluid flowpath 136. This refrigerant flow circuit 134 may also include a refrigerant flow regulator 144, 146 (e.g., a compressor, a pump and/or a valve) arranged inline with one or both of the working fluid passages 140, 142 to regulate circulation of the working fluid through each water condenser module 115 and the refrigerant condenser module 116.

The water reservoir 118 is configured to hold water before, during and/or after turbine engine operation. The water reservoir 118, for example, may be configured as or otherwise include a tank, a cylinder, a pressure vessel, a bladder or any other type of water storage container. The water reservoir 118 of FIG. 4 is fluidly coupled with and between the respective water condenser gas flowpath 132 and a water flowpath 148 of the respective water evaporator module 114 and its water evaporator 122. The system flow regulator 120 is arranged with the water reservoir 118, and configured to direct and/or meter a flow of the water from the water reservoir 118 to one or more other components 150 of the turbine engine 20. One or more of the turbine engine components 150 may each be configured as or otherwise include a steam injector. Each steam injector may be configured to inject the steam into the combustion chamber 96 (see FIG. 2). One or more of the turbine engine components 150 may also or alternatively be configured as an outlet for introducing the steam for cooling the combustor 98; e.g., a combustor wall, etc. The present disclosure, however, is not limited to the foregoing exemplary turbine engine components 150 which utilize the steam. In particular, various other uses for steam in a turbine engine are known in the art, and the present disclosure is not limited to any particular one thereof.

During operation of the recovery system 110, relatively cool cooling air is directed into an air flowpath 152 of the refrigerant condenser module 116 and its refrigerant condenser 124. The working fluid is directed into the refrigerant condenser fluid flowpath 138. The refrigerant condenser module 116 and its refrigerant condenser 124 exchange heat energy between the cooling air flowing within the refrigerant condenser air flowpath 152 and the working fluid flowing within the refrigerant condenser fluid flowpath 138. The working fluid flowing within the refrigerant condenser fluid flowpath 138 is typically warmer than the cooling air flowing within the refrigerant condenser air flowpath 152. The refrigerant condenser module 116 and its refrigerant condenser 124 are thereby operable to cool the working fluid using the cooling air. This cooling air is received through the inner bypass flowpath 46 (see FIGS. 1 and 2).

For each HX system 112, the cooled working fluid is directed into the water condenser fluid flowpath 136. The relatively hot combustion products, including the water vapor, are directed into the water condenser gas flowpath 132. The water condenser module 115 and its water condenser 123 exchange heat energy between the working fluid flowing within the water condenser fluid flowpath 136 and the combustion products flowing within the water condenser gas flowpath 132. The combustion products flowing within the water condenser gas flowpath 132 are typically warmer than the working fluid flowing within the water condenser fluid flowpath 136. The water condenser module 115 and its water condenser 123 are thereby operable to cool the combustion products using the working fluid. This cooling of the combustion products may condense at least some of the water vapor (e.g., the gaseous water) flowing within the water condenser gas flowpath 132 into liquid water droplets. At least some or all of the liquid water may be collected and separated from the remaining gaseous combustion products by a water separator 154 and subsequently directed to the water reservoir 118 for (e.g., temporary) storage. Here, the water separator 154 is configured as or otherwise includes a gutter integrated into (or connected downstream of) the water condenser module 115. However, various other types of separators are known in the art, and the present disclosure is not limited to any particular ones thereof.

The system flow regulator 120 directs the water from the water reservoir 118 into and through the water evaporator water flowpath 148. The relatively hot combustion products are further directed through the water evaporator gas flowpath 130, for example, prior to flowing through the water condenser gas flowpath 132. The water evaporator module 114 and its water evaporator 122 exchange heat energy between the water flowing within the water evaporator water flowpath 148 and the combustion products flowing within the water evaporator gas flowpath 130. The combustion products flowing within the water evaporator gas flowpath 130 are typically warmer than the liquid water flowing within the water evaporator water flowpath 148. The water evaporator module 114 and its water evaporator 122 are thereby operable to heat the water using the combustion products and thereby recuperate the heat energy from the combustion products. This heating of the water may evaporate at least some or all of the liquid water flowing within the water evaporator water flowpath 148 into gaseous water-steam. At least some of this steam is directed to the turbine engine components 150 for use in the engine core 34; e.g., use in the combustor section 31.

Referring to FIGS. 1 and 2, each water evaporator module 114 may be configured to radially cross the inner bypass flowpath 46 and the outer bypass flowpath 56 from an inner cavity 156 (e.g., an annular volume, an arcuate volume, compartment, chamber, etc.) of the inner structure 38 to an outer cavity 158 (e.g., an annular volume, an arcuate volume, compartment, chamber, etc.) of the outer structure 40. Each water evaporator module 114 of FIGS. 1 and 2, for example, includes an inner section 160, an outer section 161 and an intermediate section 162.

The inner section 160 is disposed within the inner cavity 156. This inner section 160 projects axially out (or otherwise away) from a forward, downstream end of the PT section 29 along the axis 22. The inner section 160 may extend circumferentially about the axis 22 between, for example, twenty degrees (20°) and ninety degrees (90°); e.g., between thirty-five degrees (35°) and forty-five degrees (45°). With this arrangement, each water evaporator module 114 and its inner section 160 extend circumferentially about and/or axially along the PT shaft 82. The present disclosure, however, is not limited to such an exemplary range and may be adjusted based on, for example, the number of HX systems 112 arranged about the axis 22. Each bypass flowpath 46, 56 is disposed radially outboard of, extends circumferentially about (e.g., circumscribes) and/or extends axially along (e.g., overlaps) each water evaporator module 114 and its inner section 160. Here, the inner section 160 is housed within the inner structure 38 and its inner nacelle 44.

The outer section 161 may be disposed completely or partially within the outer cavity 158. The outer section 161 of FIG. 1, for example, projects radially into the outer cavity 158 to the respective water condenser module 115 of the same HX system 112. This outer section 161 extends axially along the axis 22 between opposing axial ends of the outer section 161. The outer section 161 extends circumferentially about the axis 22 between, for example, twenty degrees (20°) and ninety degrees (90°); e.g., between thirty-five degrees (35°) and forty-five degrees (45°). With this arrangement, each water evaporator module 114 and its outer section 161 extend circumferentially about (and/or within) and/or axially along the outer bypass flowpath 56. The present disclosure, however, is not limited to such an exemplary range and may be adjusted based on, for example, the number of HX systems 112 arranged about the axis 22.

The intermediate section 162 is fluidly coupled with and between the inner section 160 and the outer section 161. The intermediate section 162, for example, extends radially between and to the inner section 160 and the outer section 161. With this arrangement, each water evaporator module 114 and its intermediate section 162 extend radially across (or at least partially within) the inner bypass flowpath 46 and/or the outer bypass flowpath 56. The intermediate section 162 may also project radially through a port 164 (e.g., an opening, a window, etc.) of the refrigerant condenser module 116 in order to cross the refrigerant condenser module 116 (see also FIG. 6).

Referring to FIGS. 6 and 7, one or more of the water evaporator modules 114 may each follow a tortuous trajectory. Each water evaporator module 114 of FIGS. 6 and 7, for example, has a C-shaped, S-shaped and/or otherwise curved (e.g., arcuate, splined, etc.) geometry. Therefore, while the intermediate section 162 extends between and fluidly couples the inner section 160 and the outer section 161 of the same water evaporator module 114, at least a portion of the water evaporator module 114 may be circumferentially aligned with another one of the water evaporator modules 114 and/or the water condenser module 115 from another HX system 112. The inner section 160 and/or the intermediate section 162 of each water evaporator module 114 of FIGS. 6 and 7, for example, is circumferentially aligned with the outer section 161 of a circumferentially neighboring water evaporator module 114 and/or the water condenser module 115 from a circumferentially neighboring HX system 112. Such overlapping may provide for gradual turning of the HX leg 128 of the core flowpath 62 (see FIGS. 1 and 2) within each water evaporator module 114 while facilitating a compact form.

Referring to FIGS. 1 and 2, each water condenser module 115 may be configured radially outboard of the water evaporator module 114 and its outer section 161 from the same HX system 112. Each water condenser module 115, for example, may be disposed in the outer cavity 158 above the respective water evaporator module 114 and its outer section

161. Each water condenser module 115 projects radially out from a radial outer side of the respective outer section 161. Each water condenser module 115 extends axially along the axis 22 between opposing axial ends of the respective water condenser module 115. Each water condenser module 115 extends circumferentially about the axis 22 between, for example, twenty degrees (20°) and ninety degrees (90°); e.g., between thirty-five degrees (35°) and forty-five degrees (45°). With this arrangement, each water condenser module 115 extends circumferentially about and/or axially along the outer bypass flowpath 56 and/or the respective outer section 161 of the water evaporator module 114. The present disclosure, however, is not limited to such an exemplary range and may be adjusted based on, for example, the number of HX systems 112 arranged about the axis 22. Here, each water condenser module 115 is housed within the outer structure 40.

One or more or each of the heat exchanger modules 114-116 may be arranged axially between the fan section 28 and its fan rotor 70 and the engine core 34 along the axis 22. However, the water separator 154 may be positioned radially outboard of and axially overlap the fan section 28 and its fan rotor 70. Of course, in other embodiments, it is contemplated one or more or each of the water condenser modules 115 may also be positioned radially outboard of and axially overlap the fan section 28 and its fan rotor 70. In general, the heat exchanger modules 114, 115 should not project axially forward of the fan section 28 and its fan rotor 70 to reduce forward turbine engine mass/cantilevered forward weight; however, the present disclosure is not limited to such an exemplary arrangement.

Referring to FIG. 1, the core flowpath 62 and each of its HX legs 128 extends axially along the axis 22 in a forward direction out of the PT section 29 and into a respective water evaporator module 114 and its inner section 160. The core flowpath 62 and each of its HX legs 128 extends radially through the intermediate section 162 from the inner section 160 to the outer section 161. The core flowpath 62 and each of its HX legs 128 extends radially out (e.g., in a radial outward direction away from the axis 22) from the respective water evaporator module 114 and its outer section 161 and into a respective water condenser module 115. The core flowpath 62 and each of its HX legs 128 extends axially along the axis 22 in the forward direction out of the respective water condenser module 115 (through the respective water separator 154) and to the core exhaust 66.

The refrigerant condenser module 116 is configured radially inboard of the outer bypass flowpath 56. More particularly, the refrigerant condenser module 116 is disposed within and/or partially forms a longitudinal section of the inner bypass flowpath 46. The refrigerant condenser module 116, for example, may be disposed within the inner cavity 156. The refrigerant condenser module 116 of FIG. 1 is disposed radially outboard of, extends circumferentially about and/or extends axially along (e.g., overlaps) the PT shaft 82. The refrigerant condenser module 116 may have an arcuate, frustoconical geometry. The refrigerant condenser module 116 of FIG. 1, for example, radially tapers inwards towards the axis 22 as the refrigerant condenser module 116 extends axially in the forward direction along the axis 22.

Configuring the recovery system 110 with multiple HX systems 112 may provide operational redundancy. Thus, even in an unlikely event that one or more of the heat exchangers 122, 123 in one of the HX legs 128 becomes clogged or otherwise loses efficiency and/or operability, the heat exchangers 122, 123 in one or more of the other HX legs 128 may still operate and facilitate continued turbine engine operation until, for example, the aircraft may land and the turbine engine 20 may be inspected, serviced and/or repaired. Furthermore, by positioning the heat exchangers 122 and/or 123 radially outboard of and/or at an outer side of the outer bypass flowpath 56, the heat exchangers 122 and/or 123 may be readily accessed via an exterior cowl door (or doors) for inspection, service, repair and/or replacement.

In some embodiments, referring to FIG. 4, the refrigerant condenser 124 may be a discrete component from the water condenser 123. However, it is contemplated the refrigerant condenser 124 may alternatively be omitted. In such embodiments, the water condenser 123 may extend into the bypass flowpath 56 (see FIG. 1) and be operable to transfer heat energy between the bypass air and the combustion products for condensing the water vapor out of the combustion products. In addition or alternatively, some of the bypass air may be bled from the bypass flowpath 56 and directed into/through the water condenser 123.

In some embodiments, the engine core 34 may be configured as a replaceable module. The engine core 34, for example, may be configured to be installed and removed by attaching and removing the engine core 34 from a portion of the inner case 42 surrounding the PT rotor 71 (see FIG. 2). With such an arrangement, turbine engine downtime may be reduced by, for example, swapping a used engine core out for a replacement engine core. The used engine core may then be inspected and/or repaired at another location and/or at another time while the turbine engine 20 may continue to operate with the replacement engine core. This arrangement is facilitated by configuring the PT rotor 71 of FIG. 2 as a free rotor; e.g., a rotor decoupled from the core rotating structures. Configuring the PT rotor 71 as a free rotor may also reduce likelihood of damage to the engine core in an unlikely event of foreign object damage (FOD) to the fan rotor 70 and its fan blades.

In some embodiments, the engine core 34 may be arranged coaxial with the fan rotor 70 and the geartrain 78. The present disclosure, however, is not limited to such an exemplary arrangement. For example, a centerline of the engine core 34 may alternatively be angularly offset from and/or (e.g., radially) displaced from a centerline of the fan rotor 70 and/or a centerline of the geartrain 78.

The turbine engine 20 is generally described above as a turbofan turbine engine. The present disclosure, however, is not limited to such an exemplary turbofan turbine engine configuration. The fan rotor 70, for example, may be configured as another type of propulsor rotor for generating propulsive thrust. Furthermore, the recovery system 110 may be included in a turbine engine configured with a single spool, with a dual spool (e.g., see FIG. 2), or with a more than two spool engine core. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A turbine engine with an axis, comprising:
a fan section;
a turbine engine core configured to power the fan section, the turbine engine core including a core compressor section, a core combustor section and a core turbine section;
a bypass flowpath fluidly coupled with and downstream of the fan section;
a recovery system including an evaporator module and a condenser module, the condenser module arranged radially outboard of and axially overlapping the bypass flowpath;
a core flowpath extending sequentially through the core compressor section, the core combustor section, the core turbine section, the evaporator module and the condenser module; and
a flow circuit including the condenser module and a second condenser module, the flow circuit configured to circulate a working fluid through the condenser module and the second condenser module;
the second condenser module arranged radially inboard of the bypass flowpath.

2. The turbine engine of claim 1, wherein the condenser module is arranged radially outboard of and axially overlaps the evaporator module.

3. The turbine engine of claim 1, wherein at least a portion of the evaporator module is arranged radially outboard of and axially overlaps the bypass flowpath.

4. The turbine engine of claim 1, wherein the evaporator module extends radially across the bypass flowpath.

5. The turbine engine of claim 1, wherein the evaporator module includes
an inner section radially inboard of and axially overlapped by the bypass flowpath;
an outer section radially outboard of and axially overlapping the bypass flowpath; and
an intermediate section fluidly coupled with and extending radially between the inner section and the outer section.

6. The turbine engine of claim 1, wherein the condenser module is arranged axially between the fan section and the turbine engine core.

7. The turbine engine of claim 1, wherein the condenser module extends circumferentially about the axis between twenty degrees and ninety degrees.

8. The turbine engine of claim 1, wherein an exhaust out from the core flowpath is disposed radially outboard of the bypass flowpath.

9. The turbine engine of claim 1, wherein
the condenser module is configured to condense water vapor flowing through the core flowpath into water, and the recovery system is configured to collect the water; and
the evaporator module is configured to evaporate at least some of the water into steam, and the recovery system is configured to provide the steam to the turbine engine core.

10. The turbine engine of claim 9, wherein the recovery system is configured to provide the steam to the core combustor section.

11. The turbine engine of claim 1, further comprising a fuel system configured to inject hydrogen fuel into a combustion chamber of the core combustor section for combustion.

12. The turbine engine of claim 1, further comprising:
a second bypass flowpath fluidly coupled with and downstream of the fan section;
the second bypass flowpath radially inboard of the bypass flowpath and extending through the second condenser module.

13. The turbine engine of claim 1, wherein
a port extends radially through the second condenser module; and
the evaporator module projects radially through the port.

14. A turbine engine with an axis, comprising:
a fan section;
a turbine engine core configured to power the fan section, the turbine engine core including a core compressor section, a core combustor section and a core turbine section;
a bypass flowpath fluidly coupled with and downstream of the fan section;
a recovery system including an evaporator module and a condenser module, the condenser module arranged radially outboard of and axially overlapping the bypass flowpath;
a core flowpath extending sequentially through the core compressor section, the core combustor section, the core turbine section, the evaporator module and the condenser module;
a second evaporator module; and
a second condenser module;
the core flowpath including a first heat exchange leg, a second heat exchange leg and a base leg, the first heat exchange leg branching off from the base leg and extending sequentially through the evaporator module and the condenser module, and the second heat exchange leg branching off from the base leg and extending sequentially through the second evaporator module and the second condenser module;
wherein the second condenser module is arranged outboard of the bypass flowpath and axially aligned with the condenser module along the axis.

15. A turbine engine with an axis, comprising:
a fan section;
a turbine engine core configured to power the fan section, the turbine engine core including a core compressor section, a core combustor section and a core turbine section;
a bypass flowpath fluidly coupled with and downstream of the fan section;
a recovery system including an evaporator module and a condenser module, the condenser module arranged radially outboard of and axially overlapping the bypass flowpath; and
a core flowpath extending sequentially through the core compressor section, the core combustor section, the core turbine section, the evaporator module and the condenser module;
wherein the core turbine section is arranged axially between the fan section and the core compressor section.

16. A turbine engine with an axis, comprising:
a fan section;
a turbine engine core configured to power the fan section, the turbine engine core including a core compressor section, a core combustor section and a core turbine section;
a bypass flowpath fluidly coupled with and downstream of the fan section;

a recovery system including an evaporator module and a condenser module, the condenser module arranged radially outboard of and axially overlapping the bypass flowpath;

a core flowpath extending sequentially through the core compressor section, the core combustor section, the core turbine section, the evaporator module and the condenser module;

a power turbine section arranged axially between the fan section and the turbine engine core; and a rotating structure including a fan rotor and a power turbine rotor, the fan rotor within the fan section and the power turbine rotor within the power turbine section.

* * * * *